United States Patent
December

(10) Patent No.: US 6,231,738 B1
(45) Date of Patent: May 15, 2001

(54) MULTILAYER ELECTRODEPOSITED COATING

(75) Inventor: Timothy S. December, Rochester, MI (US)

(73) Assignee: BASF Corporation, Southfield, MI (US)

( * ) Notice: Subject to any disclaimer, the term of this patent is extended or adjusted under 35 U.S.C. 154(b) by 0 days.

(21) Appl. No.: 09/476,153

(22) Filed: Dec. 30, 1999

Related U.S. Application Data

(63) Continuation-in-part of application No. 09/217,557, filed on Dec. 21, 1998.

(51) Int. Cl.$^7$ ..................................................... C25D 13/12
(52) U.S. Cl. .......................... 204/484; 204/493; 525/481; 525/510
(58) Field of Search .................................. 204/484, 493; 525/481, 510

(56) References Cited

U.S. PATENT DOCUMENTS

| | | | | |
|---|---|---|---|---|
| 4,968,399 | * | 11/1990 | Tsuchiya et al. | 204/484 |
| 5,275,707 | * | 1/1994 | Yamada et al. | 204/484 |

* cited by examiner

*Primary Examiner*—Kishor Mayekar
(74) *Attorney, Agent, or Firm*—Mary E. Golota

(57) ABSTRACT

The present invention provides a multilayer film composition wherein at least two layers of the multilayer film composition are applied via electrophoretic deposition processes. In a preferred embodiment, the first layer of the multilayer film composition is a conductive film layer applied by a cationic electrodeposition process with a second layer applied directly to the conductive first layer via an anodic electrodeposition process. Preferably, the second layer of the anodic electrocoat coating composition comprises a carbamate functional anodic resin.

1 Claim, No Drawings

MULTILAYER ELECTRODEPOSITED COATING

This application is a continuation in part of co-pending U.S. patent application, Ser. No. 09/217,557, filed Dec. 21, 1998, entitled "Anodic Electrocoat having a Carbamate Functional Resin", all of which is hereby incorporated by reference and upon which priority is claimed.

FIELD OF THE INVENTION

The invention provides a multilayer film composition wherein at least two or more layers are applied via electrodeposition and a process for making the multilayer film composition.

BACKGROUND OF THE INVENTION

The coating of electrically conductive substrates by electrophoretic deposition processes, or electrocoat or ecoat, is a well-known and important industrial process. The electrodeposition of primers to metal substrates used for automotive bodies is widely used in the automotive industry. In the electrodeposition of primers, a conductive article, typically metal, is immersed in a bath of a primer composition of an aqueous emulsion of film forming polymer and acts as one electrode in the electrodeposition process. An electric current is passed between the article and acts as a counter-electrode in electrical contact with the aqueous emulsion, until a desired thickness of coating is deposited on the article. In a cathodic electrocoating process, the article to be coated is the cathode and the counter-electrode is the anode. In an anodic process, the article to be coated is the anode.

In traditional automotive processes, the electrodeposited first layer is typically followed by spray application of a second coating composition, often a primer surfacer type coating or the like. It would be advantageous if the second coating could be electrodeposited. The electrodeposition process offers several advantages over spray application processes. For example, electrocoat processes typically have lower solvent emissions, reduced operating costs, higher effective paint utilization, and more uniform coating thickness. However, the surface to be coated must be conductive for electrodeposition to occur. Eventually, the electrocoated surface becomes nonconductive due to the insulative build up of the polymeric film. The insulating nature of the polymeric coating ensures a uniform film build and makes the process self limiting.

The prior art has thus sought a multilayer coating composition wherein at least two layers are applied by electrophoretic deposition processes, preferably wherein a first electrodeposited layer is subsequently overcoated with a second electrodeposited layer.

Streitberger, Beck and Guder disclosed multilayer electrocoatings in which the first layer was modified with conducting carbon blacks. (*Proc. XIXth FATIPEC Congress, Aachem* 1988, *Vol.* 2, 177–89) The epoxy based cathodically electrodeposited layer had specific resistance values which were greater than the unpigmented films. Additions of conducting black maintained the self-limiting nature of the electrocoating process. The imparted conductivity made the overcoating possible in a second electrocoat process.

U.S. Pat. No. 4,968,399 discloses a multiple electrocoating process comprising coating once or more on a substrate a first electrocoating composition, coating a second electrocoating composition on the uncured first electrocoated composition and then curing all electrodeposited coatings. The first electrodeposited coating is an aqueous dispersion containing micro gel particles having an electric charge that is specially prepared. The second electrocoat composition comprises an anionic or cationic film forming aqueous resin (C) and a thermosetting agent (D) that is self-crosslinked with said aqueous resin (C).

However, this method appears to be disadvantageous due to the use of the conductive micro gel particles.

U.S. Pat. No. 5,104,507 discloses an electrodeposition method wherein a conductive substrate is first coated by means of an anodic electrodeposition process, then subjected to thermal curing, and then subjected to a cathodic electrodeposition process. The anodic electrodeposition process is carried out until the coating insulates the substrate at which point the coating process stops. The curing step lowers the dielectric strength of the anodically deposited coating, thereby allowing the substrate to accept a cathodically deposited topcoat. The patent expressly teaches that the advantageous results of the disclosed invention cannot be obtained via the use of a cured cathodically electrodeposited first coating overcoated with an anodically electrodeposited second coating.

U.S. Pat. No. 5,203,975 discloses an electrocoating process in which a layer of a clear cathodic electrocoating composition is electrocoated over a layer of a conductive composition and cured. The conductive composition is an electrically conductive cathodic electrocoating composition containing film forming binder and pigment in a pigment to binder ratio of about 1:100 to 100:100, wherein the pigment comprises an electrically conductive pigment of silica which is either amorphous silica or a silica containing material, the silica being in association with a two dimensional network of antimony containing tin oxide crystallites in which the antimony content ranges from about 1–30% by weight of the tin oxide. However, such particular silica containing materials are commercially disadvantageous.

U.S. Pat. No. 5,223,106 discloses an electrophoretic coatable sealant composition for use in assembling automotive bodies comprising an adhesive material selected from the group consisting of epoxys, urethanes, epoxyurethane hybrids, acrylics, epoxy-acrylic hybrids, polyvinylchlorides and mixtures thereof and a conductive filler in an amount such that the sealant composition will accept electrophoretic deposition of a primer composition yet preserve the adhesive properties of the sealant composition.

Finally, U.S. Pat. No. 5,275,707 discloses a method of coating a metal article by forming a first electrodeposition coating layer having varistor properties, and then forming a second electrodeposition coating layer on said first electrodeposition coating layer by an electrodeposition coating method by use of an anionic or cationic electrodeposition coating while applying a voltage exceeding the varistor voltage.

Thus, the prior art has failed to provide a process for making a multilayer electrodeposited coating composition having advantageous application and performance properties.

It is thus an object of the invention to provide a multilayer coating composition wherein at least two successively applied layers are applied by electrophoretic deposition processes and the multilayer coating composition has advantageous properties.

SUMMARY OF THE INVENTION

These and other objects have unexpectedly been obtained with the use of the process of the invention. The process of the invention utilizes a cathodically electrodeposited first coating composition overcoated with an anodically electrodeposited second coating. The first coating composition is overcoated with the second coating composition only after the first coating composition is subjected to an amount of energy effective to cause the first coating to become conductive. The second coating composition comprises a carbamate functional anionic resin.

More particularly, the invention provides a method of making a multilayer electrodeposited composition, comprising, applying a first coating composition by electrophoretic deposition to a substrate to make a coated substrate, subjecting the coated substrate to an amount of energy effective to cause the coated substrate to become a conductive coated substrate, applying a second coating composition to the conductive coated substrate by electrophoretic deposition to make a multicoated substrate, and subjecting the multicoated substrate to conditions sufficient to result in the cure of the second coating composition so as to make a cured multicoated substrate, wherein the second coating composition is an anodic electrocoat coating composition comprising an aqueous dispersion of (a) a polymer comprising a polymer backbone having appended thereto at least one carbamate functional group, said polymer having one or more randomly repeating units according to the formula:

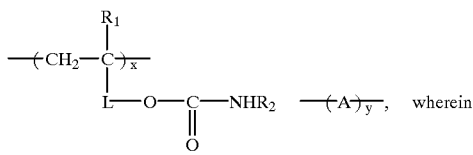

wherein $R_1$ represents H or $CH_3$, $R_2$ represents H, alkyl, or cycloalkyl, L represents a divalent linking group, A represents repeat units comprising at least one repeat unit having a pendant carboxylic acid group, x represents 10 to 90 weight %, and y represents 90 to 10 weight %, and (b) a compound having a plurality of functional groups that are reactive with said carbamate groups, wherein the repeat units A having a pendant carboxylic acid group are base-salted.

DETAILED DESCRIPTION OF THE INVENTION

The first coating composition of the invention may be any ionic functional coating composition, which upon exposure to sufficient energy, will result in a conductive coating or coated substrate. Preferably, the first coating composition will be a cathodic electrocoat composition.

Particularly preferred conductive cathodic electrocoat compositions are those disclosed in U.S. Pat. No. 4,882,090 and U.S. Pat. No. 4,988,420, both of which are entirely incorporated herein by reference.

Suitable cationic resins are cationic amine-modified epoxy resins which are the reaction products of polyepoxides, and amines selected from the group consisting of primary amines, secondary amines, tertiary amines, salts thereof, and mixtures thereof. Optionally, polyfunctional alcohols, polycarboxylic acids, polyamines, and/or polysulfides may also be used in admixture with the polyexpoxides and amines.

Water dispersible products are obtained after neutralization with one or more acids.

Suitable polyepoxides are those containing at least two epoxide groups per molecule. Preferred are those compounds which contain two epoxy groups in the molecule and have a number average molecular weight of at least 750, preferably from 400 to 500. Most preferred epoxy compounds are polyglycidyl ethers of polyphenols prepared from polyphenols and epihalohydrins. Preferred polyphenols are bisphenol A and bisphenol F and 1,1-bis(4-hydroxyphenyl)-n-heptane. Also suitable are phenolic novolak resins.

Preferred epoxy compounds also include polyglycidyl ethers of polyhydric alcohols, such as ethylene glycol, diethylene glycol, bis-(4-hydroxycyclohexyl)-2,2-propane, and the like.

It is also possible to use polyglycidyl esters of polycarboxylic acids, such as glycidyl adipate and glycidyl phthalate.

Finally, it is also possible to use hydantoin epoxides, epoxidized butadiene and polyepoxy compounds which are obtained by epoxidizing an olefinically unsaturated alicyclic compound.

Suitable amines for use in the most preferred conductive cationic first coating composition of the invention are one or more amines selected from the group consisting of primary amines, secondary amines, tertiary amines, salts thereof, and mixtures thereof. Secondary amines and the salts thereof are most preferred.

Preferably, the amine is a water soluable compound. Suitable examples include but are not limited to mono- and dialkylamines, such as methylamine, ethylamine, dimethylamine, methylbutylamine and the like. Likewise suitable are alkanolamines such as methylethanolamine, diethanolamine and the like. It is also possible to use dialkylaminoalkylamines such as dimethylaminoethylamine, diethylaminopropylamine, dimethylaminopropylamine and the like. In most cases, low molecular weight amines are most preferred.

Polyamines having primary and secondary amino groups can be reacted with the epoxy groups in the form of their ketamines. The ketimines are prepared from the polyamines in a known manner.

The amines can also contain other groups, but these groups should not interfere with the reaction of the amine with the epoxy group, nor cause the reaction mixture to gel. Examples of such amines are hdyroxylamine and the like.

The charges required for water-dilutability and electrical deposition can be produced by protonation with water-soluable acids (for example, boric acid, formic acid, lactic acid, and the like), or alternatively, by reacting the oxirane groups with amine salts, preferably, tertiary amine salts.

Most preferred amines are tertiary amines, such as dimethylethanolamine, triethylamine, trimethylamine, triisopropylamine and the like.

Optionally, the polyepoxides and amines may be reacted with polyfunctional alcohols, polycarboxylic acids, polyamines, and/or polysulfides/

Suitable polyols include diols, triols and higher polymeric polyols, such as polyester polyols, polyether polyols and the like.

Polyalkylene ether polyols suitable for use are those of the formula:

wherein R is H or a lower alkyl radical, with or without various substituents, n is 2 to 6, and m is 3 to 50 or higher. Examples are poly(oxytetramethylene) glycols and poly (oxyethylene) glycols. The preferred polyalkylene ether polyols are poly(oxytetramethylene) glycols having a number average molecular weight of 350 to 1000.

Polyester polyols may also be used. Suitable examples are those prepared by polyesterification of organic polycarbonate acids or anydrides thereof with organic polyols which contain primary hydroxyl groups. Aliphatic or aromatic dicarboxylic acids and diols are preferred as the polycarboxylic acids and polyols. Diols used include alkylene glycols such as ethylene glycol and the like and glycols such as cyclohexanedimethanol. The acid component may be carboxylic acids or anhydrides having from 2 to 18 carbons in the molecule. Examples are phthalic acid, isophthalic acid, tetrahydrophthalic acid, adipic acid, azelaic acid, sebacic acid, maleic acid, glutaric acid and the like, as well as the anhydrides thereof.

Also suitable for reaction with the polyepoxides and amines are polyester polyols which are derived from lactones. These polyols are obtained via reaction of an ε-caprolactone with a polyol. Materials of this type are described in U.S. Pat. No. 3,169,945. Most preferably, such compounds will have a terminal hydroxyl group and recurring polyester segments derived from the lactone.

Also suitable for reaction with the polyepoxides and amines are aliphatic and/or alicyclic polyfunctional alcohols or carboxylic acids having a molecular weight of below 350. Preferably, such compounds will have a branched aliphatic chain, most preferably a chain having at least one neo structure. Examples include diols such as ethylene glycol, diglycol, dipropylene glycol, dibutylene glycol, triglycol, 1,2-propane diol, 2,2-dimethyl,1,3-propanediol,, 2-methyl-2-ethyl-1,3-propanediol, 1,2-butanediol, 2-ethyl-1,4-butanediol, 2,2-diethyl-1,3-butanediol, butene-2-diol-1,4, 1,2-pentanediol, 3-methyl-1,5-pentanediol, 1,6-hexanediol, 2-ethyl-1,3-hexanediol, 2,5-dimethyl-2,5-hexanediol, 1,3-octanediol, 4,5-nonanediol, 2,10-decanediol, 2-hydroxyethyl hydroxyacetate, 2,2-dimethyl-3-hydroxypropyl2,2-dimethylhydroxypropionate, 2-methyl-2-propyl-3-hydroxypropyl2-methyl-2-propylhydroxypropionate, 4,4'-methylenebiscyclohexanol, and 4,4'-isopropylidenebiscyclohexanol. Most preferred diols are 2,2-dimethyl-1,3-propanediol, 3-methyl-1,5-pentanediol, 2,2-dimethyl-3-hydroxypropyl 2,2-diemethylhydroxylpropionate and 4,4'-isopropylidenebiscyclohexanol.

Illustrative carboxylic acids are those such as oxalic acid, malonic acid, 2,2-dimethylnalonic acid, succinic acid, glutaric acid, adipic acid, hexahydroxphthalic acid, maleic acid, fumaric acid, pimelic acid, suberic acid, azelaic acid, sebacic acid, itaconic acid, citraconic acid, mesaconic acid, and glutaconic acid.

Also suitable for reaction with the polyepoxides and amines are dicarboxylic acids such as 2,2-dimethylmalonic acid, hexahydrophthalic acid, and dimeric fatty acids such as dimeric linoleic acid.

Suitable polyamines for use in the reaction between the polyepoxides and amines are those prepared by reaction of primary diamines and monoepoxides.

Finally, other compounds which may be used in the reaction between the polyepoxides and amines are polyfunctional SH compounds, polyphenols, and polyurethanes.

The binders used in the conductive cationic first coating composition can be conventionally crosslinked by addition of crosslinking agents or converted into self-crosslinking systems by chemical modification. A self-crosslinking system can be obtained by reacting the binder with a partially blocked polyisocyanate which has on average one free isocyanate group per molecule and whole blocked isocyanate groups only become unblocked at elevated temperatures. Suitable crosslinking agents are almost all at least bifunctional compounds which react with oxirane groups, for example amino resins, polyalcohols, polyphenols, polycarboxylic acids, polycarboxylic anhydrides, polycarboxamides, polyamines, polyisocyanates, phenolic resins, and mixtures thereof.

The crosslinking agents are generally used in an amount of from 5 to 60, preferably 20 to 40, percent by weight, based on the binder.

The conductive cationic first coating composition may further contain additives such as coalescent solvents, pigments, surface-active agents, crosslinking catalysts, antioxidants, fillers, antifoam agents, and the like.

The conductive cationic first coating composition must contain at least one material which can impart conductivity to the first coating composition upon exposure to an effective amount of energy.

Most preferably, the cationic first coating composition will contain one or more carbon black pigments having an iodine absorption of 870–930 mg/g, a specific surface area (BET/$N_2$) of 850–1,000 $m^2$/g, a pore volume (DBP) of 330–390 ml/100 g and an average particle size of 25–35 nm.

A most preferred carbon black for use in the cationic conductive first coating composition will have an iodine absorption of 900 mg/g, a specific surface area (BET/$N_2$) of 950 $m^2$/g, a pore volume (DBP) of 360 ml/100 g and an average particle size of 30 nm. Commercially available examples of suitable carbon blacks include KETJENBLACK EC marketed by Akzo Chemie.

Such conductive carbon blacks are preferably used in an amount of from 1.5 to 5.1% by weight, based on total solids.

The conductive cationic first coating composition of the invention is placed in a bath suitable for dipping the articles to be coated. Once the article is immersed in the bath, an electrical voltage is applied between an anode and the article connected as cathode, and coating of the substrate occurs. Upon conclusion of coating, the coated article is removed from the bath, rinsed off and subjected to an amount of energy effective to cause the coated article or substrate to become conductive, i.e, capable of carrying a charge sufficient to allow overcoating of the first coated substrate with a second electrodeposited coating composition. Typically, the coated article or substrate will be placed in a heated oven for a time sufficient to effect substantial, most preferably, complete, crosslinking and cure of the first coating composition. However, it will be appreciated that in some first coating composition, shrinkage due to less than complete cure may be sufficient to result in a conductive coated substrate. Suitable energy sources include ovens, IR units and blackwall energy sources. Traditional ovens are most preferred.

Once conductive, the substrate coated with the first coating composition may be overcoated with the second coating composition via electrodeposition. Preferably, the second coating composition will be an anodic coating composition and most preferably, the coating composition will comprise a carbamate functional anionic polymer (a).

The polymer (a) most preferably used will have at least one carbamate functional group appended to a polymer backbone, preferably a plurality of pendant carbamate functional groups.

Polymer (a) can be prepared in a variety of ways. One way to prepare such polymers is to prepare an acrylic monomer having a carbamate functionality in the ester portion of the monomer. Such monomers are well-known in the art and are described, for example in U.S. Pat. Nos. 3,479,328, 3,674, 838, 4,126,747, 4,279,833, and 4,340,497, the disclosures of which are incorporated herein by reference. One method of synthesis involves reaction of a hydroxy ester with urea to form the carbamyloxy carboxylate (i.e., carbamate-modified acrylic). Another method of synthesis reacts an α, β-unsaturated acid ester with a hydroxy carbamate ester to form the carbamyloxy carboxylate. Yet another technique involves formation of a hydroxyalkyl carbamate by reacting a primary or secondary amine or diamine with a cyclic carbonate such as ethylene carbonate. The hydroxyl group on the hydroxyalkyl carbamate is then esterified by reaction with acrylic or methacrylic acid to form the monomer. Other methods of preparing carbamate-modified acrylic monomers are described in the art, and can be utilized as well. The acrylic monomer can then be polymerized along with other ethylenically-unsaturated monomers, if desired, by techniques well-known in the art. However, such ethylenically unsaturated monomers must comprise at least one monomer having a pendant carboxylic acid group.

For example, preferred methods of preparing the polymer (a) include the following.

One or more carbamate functional monomers such as 2-carbamate ethyl methyacrylate (CEMA) may be copolymerized with two or more monomers such as an unsaturated organic acid and a alkyl ester of an unsaturated organic acid in the presence of a suitable initiator such as an azo or peroxide initiator. Other suitable carbamate functional monomers include those described above. Suitable unsaturated organic acids will be of the formulas $R^1R^2\!=\!R^3COOH$ or $R^1R^2\!=\!R^3R^4COOH$, where $R^1$, $R^2$, $R^3$, and $R^4$ may be the same or different and are selected from the group consisting of H, alkyl groups of from 2 to 12 carbons, and mixtures thereof. Examples of suitable unsaturated organic acids include acrylic acid, methacrylic acid, crotoic acid, vinylacetate acid, tiglic acid, 3,3-dimethylacrylic acid, trans-2-pentenoic acid, 4-pentenoic acid, trans-2-methyl-2-pentenoic acid, 6-heptanoic acid, 2-octenoic acid, and the like. Preferred unsaturated organic acids include acrylic acid, methacrylic acid, and mixtures thereof Examples of suitable alkyl esters of unsaturated organic acid include ethyl acrylate, butyl acrylate, 2-ethylhexyl acrylate, butyl methyacrylate, isodecyl methyacrylate, hydroxyethyl methacrylate, hydroxypropyl methacrylate, and the like. Preferred alkyl esters are nonhydroxy functional esters such as butyl acrylate and butylmethacrylate.

Other ethylenically unsaturated monomers such as styrene may be used to form repeating units A, discussed below.

In another reaction scheme, an isocyanate functional monomer such as unsaturated m-tetramethyl xylene isocyanate (sold by American Cyanamid as TMI®) can be copolymerized with monomers such as alyl esters such as described immediately above such as butyl acrylate and unsaturated monomers such as styrene to produce an isocyanate functional polymer. The required carboxylic acid functionality and carbamate functionality can then be grafted onto the isocyanate functional polymer by a two-stage reaction having a first stage using a carbamate functional monomer such as hydroxypropyl carbamate followed by a second stage using a carboxylic acid of the formula HO—(R)—COOH or an amine salt of the formula HO—(R)—COOH$^+$NR$_3$, wherein R is an alkyl group of from 1 to 12 carbons, preferably from 2 to 8 carbons.

Alternatively, one or more carbamate functional monomers may be reacted with an isocyanate functional monomer such as an unsaturated m-tetramethyl xylene isocyanate to produce a carbamate functional monomer. Additional isocyanate monomer may be added to introduce isocyanate funtionality in the monomer mixture. After polymerizing the one or more monomers, the required pendant carboxylic acid functionality can be grafted onto the polymer backbone using a carboxylic acid functional compound having at least one group reactive with an isocyanate, such as a hydroxy carboxylic acid.

Alternatively, carbamate functional adducts made from polyisocyanate functional compounds such as IPDI or TDI and hydroxy carbamate compounds can be made and then grafted onto acrylic, epoxy or other hydroxy functional polymers having acid numbers of at least 20, preferably 30. Of course, it will be appreciated that such resins must have the characteristics required for in electrocoat compositions as discussed herein. Preferred polymers for use as the backbone are hydroxyl functional acrylic resins with acid numbers of at least 20, preferably at least 30.

A most preferred method of making the polymer (a) involves the copolymerization of at least one carbamate functional monomer, at least one unsaturated organic acid, at least one alkyl ester of an unsaturated organic acid and at least one additional ethylenically unsaturated monomer such as styrene. A most preferred reaction scheme involves the copolymerization of CEMA, acrylic acid, styrene and butyl acrylate in the presence of an azo or peroxide initiator.

The polymer component (a) can be represented by the randomly repeating units according to the following formula:

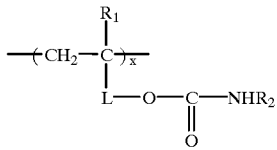

In the above formula, $R_1$ represents H or $CH_3$. R2 represents H, alkyl, preferably of 1 to 6 carbon atoms, or cycloalkyl, preferably up to 6 ring carbon atoms. It is to be understood that the terms alkyl and cycloalkyl are to include substituted alkyl and cycloalkyl, such as halogen-substituted alkyl or cycloalkyl. Substituents that will have an adverse impact on the properties of the cured material, however, are to be avoided. For example, ether linkages are thought to be susceptible to hydrolysis, and should be avoided in locations that would place the ether linkage in the crosslink matrix. The values x and y represent weight percentages, with x being 10 to 90% and preferably 40 to 60%, and y being 90 to 10% and preferably 60 to 40%.

In the formula, A represents repeat units derived from one or more ethylenically unsaturated monomers, at least one of which repeat units must have a pendant carboxylic acid group. The at least one carboxylic acid group may derive from the use of at least one ethylenically unsaturated monomer having at least one carboxylic acid group, preferably a pendant or terminal carboxylic acid group. Alternatively, the at least one repeating unit having a pendant carboxylic acid may derive from the graft of a free organic acid to the polymer backbone of the repeating units (A), as discussed above, wherein such free organic acid has a functional group reactive with the backbone polymer.

Examples of ethylenically unsaturated monomers having a pendant carboxylic acid group include acrylic acid, methacrylic acid, crotoic acid, vinylacetate acid, tiglic acid, 3,3-dimethylacrylic acid, trans-2-pentenoic acid, 4-pentenoic acid, trans-2-methyl-2-pentenoic acid, 6-heptanoic acid, 2-octenoic acid, and the like. Preferred ethylenically unsaturated monomers having a pendant carboxylic acid are acrylic acid, methacrylic acid and mixtures there of.

Examples of free organic acids which may be used to graft a pendant carboxylic acid group to the backbone polymer include compounds of the formula HO—(R)—COOH or an amine salt of the formula HO—(R)—COOH$^+$NR$_3$, wherein R is an alkyl group of from 1 to 12 carbons, preferably from 2 to 8 carbons. Polyacids such as malic acid and citric acid may also be used. Preferred organic free acids are lactic acid, glycolic acid and stearic acid.

Other monomers which may be utilized to provide repeating units (A) not having pendant carboxylic acid functionality are those monomers for copolymerization with acrylic monomers known in the art. These include alkyl esters of acrylic or methacrylic acid, e.g., ethyl acrylate, butyl acrylate, 2-ethylhexyl acrylate, butyl methacrylate, isodecyl methacrylate, hydroxyethyl methacrylate, hydroxypropyl acrylate, and the like; and vinyl monomers such as unsaturated m-tetramethyl xylene isocyanate (sold by American Cyanamid as TMI®), styrene, vinyl toluene and the like.

L represents a divalent linking group, preferably an aliphatic of 1 to 8 carbon atoms, cycloaliphatic, or aromatic linking group of 6 to 10 carbon atoms. Examples of L include

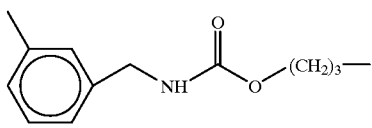

—(CH$_2$)—, —(CH$_2$)$_2$—, —(CH$_2$)$_4$—, and the like. In one preferred embodiment, —L— is represented by —COO—L'— where L' is a divalent linking group. Thus, in a preferred embodiment of the invention, the polymer component (a) is represented by randomly repeating units according to the following formula:

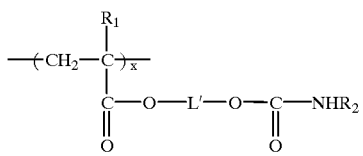

In this formula, R$_1$, R$_2$, A, x, and y are as defined above. L' may be a divalent aliphatic linking group, preferably of 1 to 8 carbon atoms, e.g., —(CH$_2$)—, —(CH$_2$)$_2$—, —(CH$_2$)$_4$—, and the like, or a divalent cycloaliphatic linking group, preferably up to 8 carbon atoms, e.g., cyclohexyl, and the like. However, other divalent liking groups can be used, depending on the technique used to prepare the polymer. For example, if a hydroxyalkyl carbamate is adducted onto an isocyanate-functional acrylic polymer, the linking group L' would include an —NHCOO— urethane linkage as a residue of the isocyanate group. Of course, A would still require the necessary pendant carboxylic acid groups as discussed above.

The polymer (a) will generally have a weight average molecular weight of 2000–100,000, and preferably from 10,000–60,000. Molecular weight can be determined by the GPC method using a polystyrene standard.

The glass transition temperature, T$_g$, of components (a) and (b) can be adjusted to achieve a cured coating having the T$_g$ for the particular application involved. The average T$_g$ of unreacted components (a) and (b) should be between 0° C.

and 100° C., with the individual T$_g$'s being adjusted to achieve optimum performance.

Polymer (a) may be further characterized by an acid number of from 20 to 80, preferably an acid number of from 30 to 50 and most preferably an acid number of from 30 to 35.

Polymer (a) should also have a carbamate equivalent weight (grams of polymer (a)/equivalent of carbamate) of from 150 to 1200, preferably from 200 to 600, and most preferably from 300 to 400.

It be will appreciated that the various monomers and/or reactants used to make polymer (a) will be used in amounts necessary to obtain the required acid number, Tg, weight average molecular weight and carbamate equivalent weight.

The anodic coating composition most preferably used as second coating composition may also comprise a curing agent (b). Curing agent (b) is a compound having a plurality of functional groups that are reactive with the carbamate groups on component (a). Such reactive groups include active methylol or methylalkoxy groups on aminoplast crosslinking agents or on other compounds such as phenol/formaldehyde adducts, isocyanate groups, siloxane groups, cyclic carbonate groups, and anhydride groups. Examples of (b) compounds include melamine formaldehyde resin (including monomeric or polymeric melamine resin and partially or fully alkylated melamine resin), urea resins (e.g., methylol ureas such as urea formaldehyde resin, alkoxy ureas such as butylated urea formaldehyde resin), benzoguanamine resins, glycol uril formaldehyde resins, polyanhydrides (e.g., polysuccinic anhydride), and polysiloxanes (e.g., trimethoxy siloxane). Aminoplast resin such as melamine formaldehyde resin or urea formaldehyde resin are especially preferred.

Polymer (a) when base-salted is water-dispersible and is useful in electrodeposition processes, especially when incorporated into an emulsion or dispersion. The aqueous dispersion of polymer (a) should be neutralized to a degree sufficient to (i) form an emulsion micelle of less than 0.50 μm, preferably less than 0.20 μm, and (ii) provide emulsion stability in the electrocoat deposition bath.

The second electrodepositable coating compositions is dispersed in an aqueous medium. The term "dispersion" as used within the context of the present invention is believed to be a two-phase translucent or opaque aqueous resinous system in which the resin is in the dispersed phase and water the continuous phase. The average particle size diameter of the resinous phase is about 0.05 to 5.0 microns, preferably less than 2.0 microns.

The concentration of the polymer (a) in the aqueous medium is, in general, not critical, but ordinarily the major portion of the aqueous dispersion is water. The aqueous dispersion usually contains from about 3 to 50 percent, preferably 10 to 40 percent by weight resin solids. Aqueous resin concentrates which are to be further diluted with water, generally range from 10 to 30 percent by total weight solids.

Polymer (a) must be base-salted for use in the anodic second coating composition of the invention. The term "base-salted" refers to the reaction of the pendant carboxylic acid groups with a basic compound in an amount sufficient to neutralize enough of the acid groups to impart water-dispersibility to polymer (a). It will be appreciated that this reaction may be referred to as "salting" or "neutralizing". Illustrative basic compounds include Lewis and Bronstead bases. Examples of suitable bases for use in base-salting or neutralizing the polymer (a) include amines and hydroxide compounds such as potassium hydroxide and sodium hydroxide. Amines are preferred. Illustrative amines include N,N-dimethylethylamine (DMEA), N,N-diethylmethylamine, triethylamine, triethanolamine, triisopropylamine, dimethylethanolamine, diethylethanolamine, diisopropylethanolamine, dibutylethanolamine, methyldiethanolamine, dimethylisopropanolamine, methyldiisopropanolamine, dimethylethanolamine, and the like. Preferred amines are tertiary amines such as dimethylethylamine and dimethylethanolamine.

The second coating composition of the invention can further contain catalysts to facilitate the reaction between polymer (a) and curing agent (b). For example, a strong acid catalyst may be utilized to enhance the cure reaction. It will be appreciated that such catalysts may be blocked or unblocked. Such catalysts are well-known in the art and include, for example, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Other catalysts that may be useful in the composition of the invention include Lewis acids, zinc salts, and tin salts. Such catalysts will typically be used in an amount of from 0.1 to 3.0 weight percent, based on the resin solids, preferably from 0.5 to 2.0 weight percent, based on the resin solids.

Besides water, the aqueous medium of an electrocoat composition may also contain a coalescing solvent. Useful coalescing solvents include hydrocarbons, alcohols, esters, ethers and ketones. The preferred coalescing solvents include alcohols, polyols and ketones. Specific coalescing solvents include monobutyl and monohexyl ethers of ethylene glycol, and phenyl ether of propylene, ethylene glycol butyl ether, ethyleneglycol dimethyl ether, or mixtures thereof. A small amount of a water-immiscible organic solvent such as xylene, toluene, methyl isobutyl ketone or 2-ethylhexanol may be added to the mixture of water and the water-miscible organic solvent. The amount of coalescing solvent is not unduly critical and is generally between about 0 to 15 percent by weight, preferably about 0.5 to 5 percent by weight based on total weight of the resin solids.

Electrodeposition coating compositions suitable for use as second coating composition may further contain conventional pigments such as titanium dioxide, ferric oxide, carbon black, aluminum silicate, precipitated barium sulfate, aluminum phosphomolybdate, strontium chromate, basic lead silicate or lead chromate. The pigment-to-resin weight ratio can be important and should be preferably less than 50:100, more preferably less than 40:100, and usually about 10 to 30:100. Higher pigment-to-resin solids weight ratios have also been found to adversely affect coalescence, flow, and/or coating performance.

Both the first and second electrodeposition coating compositions can contain optional ingredients such as wetting agents, surfactants, defoamers, antioxidants, UV absorbers, light stabilizers, and so forth. Examples of surfactants and wetting agents include alkyl imidazolines such as those available from Ciba-Geigy Industrial Chemicals as Amine C®, acetylenic alcohols available from Air Products and Chemicals as Surfynol® 104. These optional ingredients, when present, constitute from about 0 to 20 percent by weight of resin solids, and preferably from 0.1 to 1.0 percent by weight of resin solids. Plasticizers are optional ingredients because they promote flow. Examples are high boiling water immiscible materials such as polyalkylene polyols, such as polypropylene polyols or ethylene or propylene oxide adducts of nonyl phenols or bisphenol A. Plasticizers can be used and if so are usually used at levels of about 0 to 15 percent by weight resin solids.

In general, sufficient water is added so that the dispersion has a solids content of more than 20, preferably more than 30% by weight.

The second electrodeposition coating composition should have an electroconductivity from 0.1 to 5 mS/cm, preferably from 0.5 to 3 mS/cm. When this value is too low, it is difficult to obtain a film thickness having desired protective and other functions. Conversely, if the composition is too conductive, problems such as the dissolution of substrate or counter electrode in the bath, uneven film thickness or poor water or corrosion resistance may arise.

The second electrodeposition coating composition may be applied on the conductive substrate of the first coating composition by the electrodeposition coating process at a nonvolatile content of 10 to 25% by weight to a dry film thickness of 10 to 35 microns. After application, the second coating may be cured at an elevated temperature, depending upon the nature of particular base resins. The most prefered anodic second coating compositions of the invention may cure at 20 minutes at 250° F. or less (metal temperature), preferably at 20 minutes at 200° F. (metal temperature).

The second coating composition is advantageous in that % weight loss upon crosslinking is less than 15%, preferably less than 10% and most preferably from 6 to 8%, based on the total weight of applied coating.

It will be appreciated that the method of anodic deposition of the invention may further comprise rinsing and baking the coated substrate after removal from the coating composition bath.

Electrodeposition of the coating preparations according to the invention may be carried out by any of a number of processes known to those skilled in the art. The deposition may be carried out on all electrically conducting substrates, for example metal, such as steel, copper, aluminum and the like.

I claim:

1. A method of making a multilayer electrodeposited composition, comprising, applying a first coating composition by electrophoretic deposition to a substrate to make a coated substrate, subjecting the coated substrate to an amount of energy effective to cause the coated substrate to become a conductive coated substrate, applying a second coating composition to the conductive coated substrate by electrophoretic deposition to make a multicoated substrate, and subjecting the multicoated substrate to conditions sufficient to result in the cure of the second coating composition so as to make a cured multicoated substrate, wherein the second coating composition comprises an anodic electrocoat coating composition comprising an aqueous dispersion of (a) a polymer comprising a polymer backbone having appended thereto at least one carbamate functional group, said first component represented by randomly repeating units according to the formula:

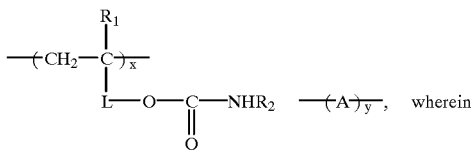, wherein $R_1$ represents H or $CH_3$, $R_2$ represents H, alkyl, or cycloalkyl,
L represents a divalent linking group,
A represents repeat units comprising at least one repeat unit having a pendant carboxylic acid group,
x represents 10 to 90 weight %, and
y represents 90 to 10 weight %, and (b) a compound having a plurality of functional groups that are reactive with said carbamate groups, wherein the repeat units A having a pendant carboxylic acid group are base-salted.

* * * * *